Patented Feb. 9, 1932

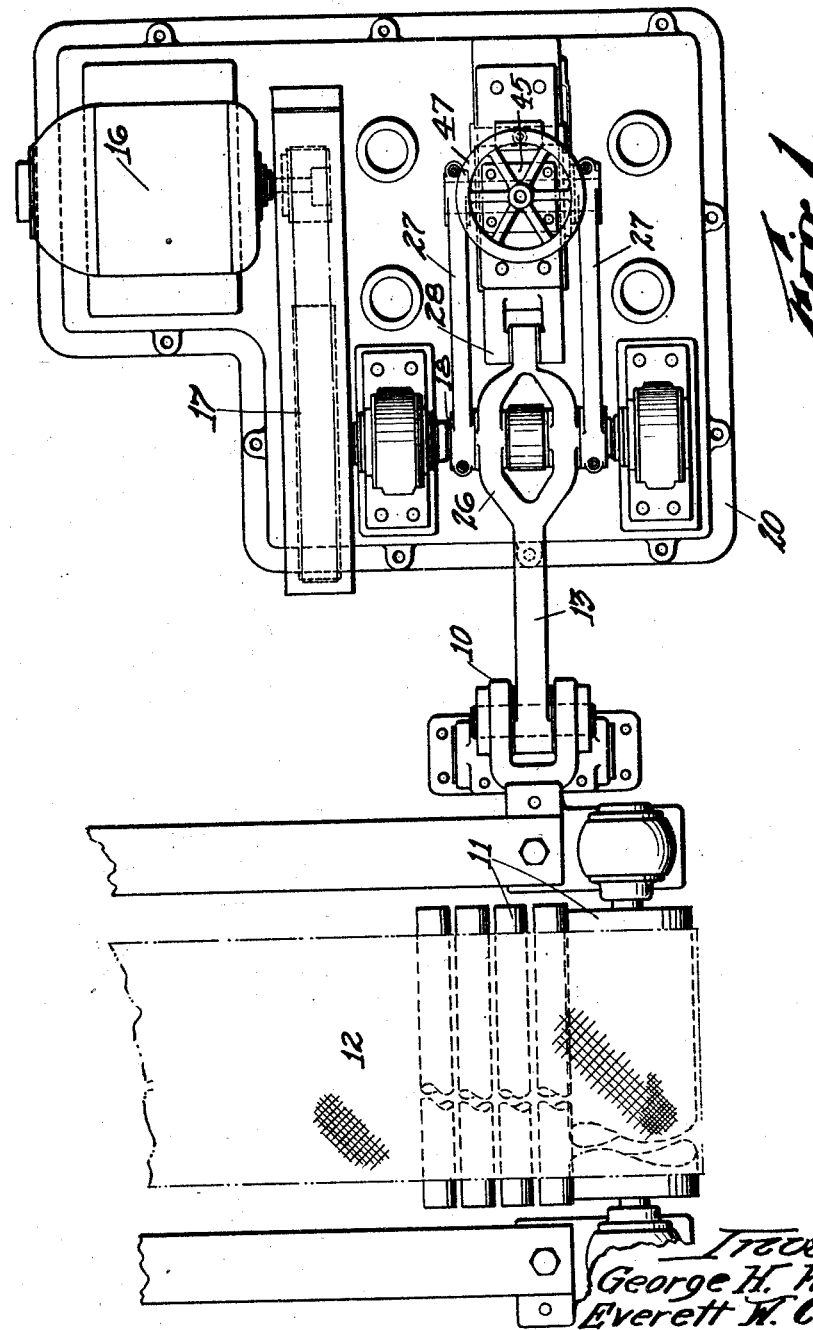

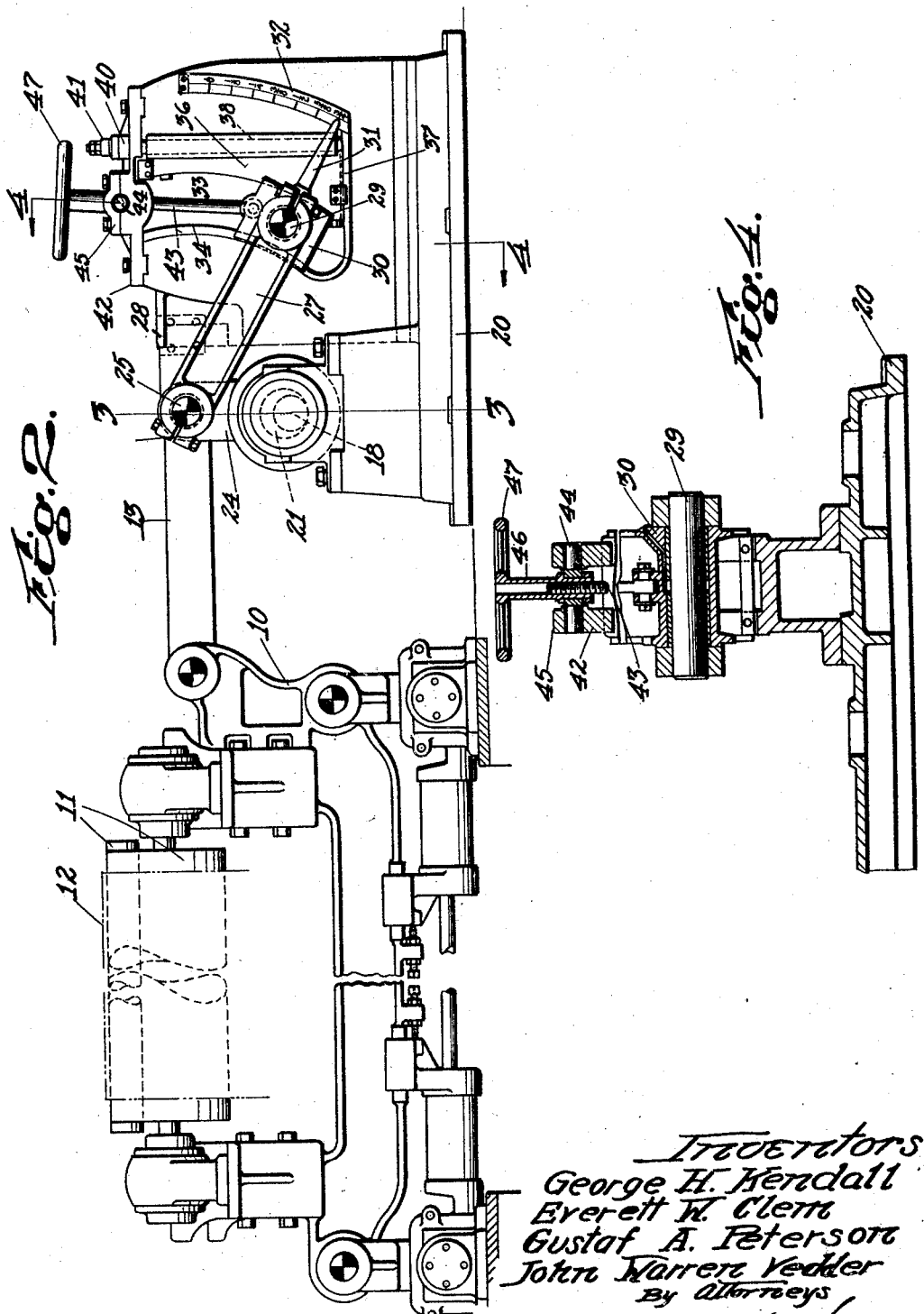

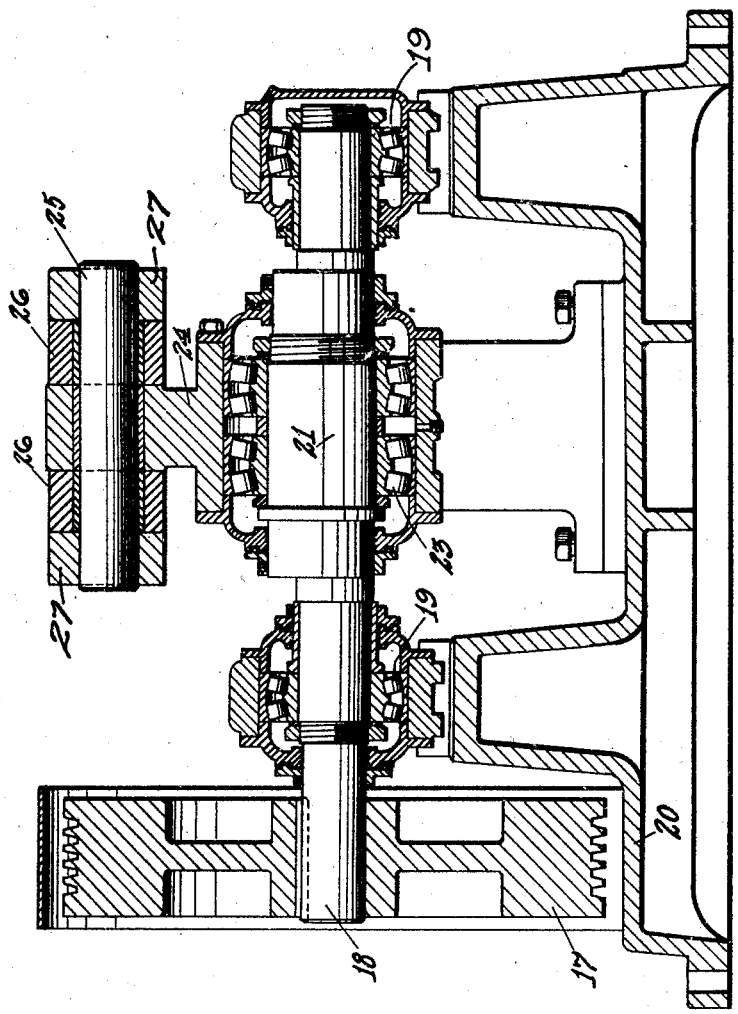

1,844,580

UNITED STATES PATENT OFFICE

GEORGE H. KENDALL, OF BELMONT, AND EVERETT W. CLEM, GUSTAF A. PETERSON, AND JOHN WARREN VEDDER, OF WORCESTER, MASSACHUSETTS, ASSIGNORS TO RICE, BARTON & FALES, INCORPORATED, OF WORCESTER, MASSACHUSETTS, A CORPORATION OF MASSACHUSETTS

FOURDRINIER WIRE SHAKER

Application filed May 25, 1931. Serial No. 539,806.

The principal objects of this invention are to provide a shaker or oscillator for a Fourdrinier wire or the like which will not set up a pounding action in a Fourdrinier shaking mechanism and thus work loose; which will impart the vibrating motion to the wire by means of a substantially vertical reciprocation and transmit that to the wire support as a horizontal vibration on account of the fact that the part which reciprocates vertically is tied to a positive immovable center about which the vertically reciprocating part is adapted swing slightly, thus transferring the vibration in the manner set forth above; to provide means for adjusting the amplitude of the vibrations of the wire; to provide means whereby this adjustment can be made when the shaking equipment is running by loosening certain parts and these parts can thereafter be tightened so that, after tightening, there is no chance for a knock to develop in the transmitting mechanism; and to provide this in a simple and durable construction.

Other objects and advantages of the invention will appear hereinafter.

Reference is to be had to the accompanying drawings, in which

Fig. 1 is a plan of a machine embodying this invention showing it connected with the support for the Fourdrinier wire;

Fig. 2 is a side view of the vibrating mechanism;

Fig. 3 is a sectional view on the line 3—3 of Fig. 2, and

Fig. 4 is a sectional view on the line 4—4 of Fig. 2.

It will be understood that the support 10 for the rolls 11 on which the Fourdrinier wire 12 is carried may be of any desired kind and one construction is illustrated. The object of this invention is to vibrate the wire 12 transversely in its own plane in a horizontal direction. The wire is vibrated by an arm 13 as usual through the usual methods of construction. The problem is to so operate on the arm 13 as to secure proper vibrations of the Fourdrinier wire and the results above mentioned.

The shaking equipment is shown as being operated by a motor 16 belted to a pulley 17 on a shaft 18 but the drive is not a feature of the invention. The shaft 18 is mounted in bearings 19 on the base 20 of the machine. It is provided with an eccentric 21 which is located, of course, in an eccentric strap comprising an arm 24 which in turn has bearings 23. The arm 24 extends upwardly and carries a shaft 25 in a suitable sleeve or bushing.

On this shaft are centered a pair of spaced arms 26 integral with each other and with the arm 13. The end of this arm is guided by guides 28 fixed on the base 20. Two links 27 are also pivoted to this shaft 25. They have split ends adapted to be secured together by bolts so that there will be no looseness in the bearing. These links extend backwardly from the pivot stud 25 and at an inclination.

At the rear end these links 27 are pivoted to a stud 29 which extends crossways and is mounted in a block 30. All these connections it will be seen are pivotal. On this block is a pointer 31 and on the base is a scale 32 by which the amplitude of the vibrations of the Fourdrinier wire is indicated.

In the base of the machine is an opening 33 which extends down from the top to a point preferably below the shaft 18. This opening has a stationary convex arcuate surface 34, which is drawn on the center of the shaft 25 and concentric with it. The block 30 has a concave surface fitting this arc and is adapted, as will be seen, to be adjusted up and down the arc. On the opposite side of the block 30 is a convex arcuate surface which fits against a bearing member 36. This bearing member 36 is mounted in the upright opening 33 and its inner concave surface is concentric with the convex surface 34 both of them bearing against the corresponding surfaces of the block 30. The member 36 is movable horizontally on a flat horizontal surface 37 at the bottom of the opening 33.

For the purpose of permitting adjustment in the throw of the Fourdrinier wire by raising or lowering the block 30, a tapering wedge 38 is mounted behind the member 36 with one surface fitting against the wall of the base of the machine which really forms the rear wall of the opening 33. The surfaces along which the members 36 and 38 contact with each other are inclined. The wedge is raised and lowered by a screw 40 and a series of nuts and check nuts 41 at the top which keep this screw located with respect to a plate 42 carried by the frame.

Also carried by the plate 42 is a transverse stud 44 or pivot, held under capped bearings 45, having swiveled between its bearings a vertical tubular member 46 having internal threads and a hand wheel 47 on the top. This nut passes through the center of this pivot stud 44 and receives the screw threaded upper end of a rod 43 which is pivoted to the block 30 and is adapted to move it up and down. The stud 44 is oscillatably mounted on its own axis. Thus, with a pivot at each end, the rod 43 cannot bind. Now it will be seen that, if the wedge 38 is moved up so as to release the pressure on the block 30, that block can be raised and lowered by the hand wheel 47 until the pointer 31 reaches the desired point on the scale 32. Then the wedge 38 can be forced down again so that the block 30 will be held in a fixed position.

When the block 30 is thus fixed, the rotation of the eccentric 21 will raise and lower the shaft 25. As the shaft 29 is fixed and the center of the eccentric 21 is fixed, this motion can take place only by the swinging of the shaft 25 about the center of the shaft 29. Therefore lateral vibration of the arm 13 is caused and transmitted to the Fourdrinier wire.

This results in securing the desired motion for the Fourdrinier wire and is a material simplification of the mechanism now on the market. The adjustment of the amplitude of vibration of the Fourdrinier wire is very simple and easily operated. The scale shows exactly the amount of vibration so that no figuring has to be done and no observations have to be made except on this scale. By fixing the point at which the shaft 29 is located in the positive manner indicated, hammer is entirely taken out of the mechanism and a change can be made in the amplitude of vibration of the wire, while the machine is running, without enabling any hammer to take place except for a few instants. The machine therefore is quiet running and extremely durable.

Although we have illustrated and described only one form of the invention, we are aware of the fact that modifications can be made therein by any person skilled in the art without departing from the scope of the invention as expressed in the claims. Therefore, we do not wish to be limited to all the details of construction herein shown and described, but what we do claim is:—

1. In a Fourdrinier paper machine, the combination with a Fourdrinier wire and a laterally movable support therefor, of a shaft connected with said support, a link pivoted to said shaft, said link extending backwardly at an inclination therefrom and pivoted at a fixed point, and means for vibrating the shaft in a direction transverse to its length.

2. In a Fourdrinier paper machine, the combination with a Fourdrinier wire and a laterally movable support therefor, of a shaft connected with said support, a link pivoted to the shaft, said link extending backwardly at an inclination therefrom and pivoted at a fixed point, a shaft, an eccentric on said shaft and an eccentric strap on the eccentric pivotally connected with the first named shaft, whereby the rotation of the last-named shaft will oscillate the first named shaft.

3. In a Fourdrinier wire vibrator, the combination of a shaft, a second shaft located above it, means on the first shaft for vibrating the second shaft up and down, a fixed pivot, a link of fixed length pivotally connected with the second shaft and the pivot, whereby the vibration of the second shaft up and down will be transmitted into a lateral motion, and means for connecting the second shaft with the Fourdrinier wire.

4. In a Fourdrinier paper machine, the combination of a shaft having an eccentric thereon, an eccentric strap extending upwardly, a second shaft supported by the eccentric strap, an arm extending laterally from the second shaft and connected with the Fourdrinier wire mechanism for vibrating the same, and means for pivoting the second shaft to a fixed point, whereby the vibrations of the second shaft up and down will be permitted to take place only accompanied by lateral vibrations which are transmitted to the Fourdrinier mechanism.

5. In an oscillating device, the combination with a laterally movable support for the member to be oscillated and a horizontal arm connected therewith, a horizontal pivot at the other end of the arm, a shaft below the pivot having an eccentric thereon, an eccentric strap for the eccentric extending upwardly and connected with said pivot, a link pivoted on the pivot and extending backwardly, and an adjustable pivot for said link adapted to be fixed in its adjusted positions, whereby the rotation of the eccentric will vibrate the support horizontally.

6. In a Fourdrinier wire oscillating device, the combination with a laterally movable support for the Fourdrinier wire and an arm connected therewith, a pivot at the other end of the arm, a shaft below the pivot having an eccentric thereon, an eccentric strap for the eccentric connected with said pivot, a link pivoted on the pivot and extending backwardly, an adjustable pivot for said link adapted to be fixed in its adjusted positions, whereby the rotation of the eccentric will vibrate the Fourdriner support in a transverse direction, a pointer extending from said link, and a fixed scale over which said pointer moves as the pivot is adjusted to indicate the throw of the Fourdrinier wire at different adjustments.

7. In a Fourdrinier wire vibrator device, the combination of a pivot shaft connected with the Fourdrinier mechanism and means for vibrating said shaft vertically, of a link pivoted on the pivot shaft and extending backwardly at an inclination, a block, a pivot stud mounted on said block and connected with said link, means for guiding said block to move in an arc centered on the first-named shaft, for adjustment, said means comprising a bearing member having a curved surface, said bearing member being movable back away from the block to permit the block to be adjusted, and a wedge located back of the bearing member and having means for operating it to force the bearing member up against the block after adjustment has been made, to fix the block in stationary position.

8. In a Fourdrinier wire vibrator device, the combination of a pivot shaft, means for connecting the shaft with the Fourdrinier wire, means for vibrating said shaft in a direction transverse to its axis and transverse to the direction in which the Fourdrinier wire is located from it, a link pivoted on said shaft and extending backwardly at an inclination, a block to which the other end of said link is pivotally connected, said block being movable up and down, means for fixing the block in its adjusted positions, a pivot stud carried by the block, a screw pivoted on the pivot block and extending upwardly, a pivot to which the screw is connected near its upper end, and a hand wheel connected with the screw for moving it up and down as the hand wheel turns, said hand wheel being rotatably mounted on the second pivot stud.

9. In a paper machine, the combination of a pivot, means for oscillating the pivot in one direction, a link pivoted to the pivot and extending at an inclination therefrom, a fixed pivot for said link, whereby the link will restrain the first-named pivot to move in the arc of a circle about the fixed pivot, and means for transmitting the lateral motion of the first-named pivot to the device to be vibrated.

In testimony whereof we have hereunto affixed our signatures.

GEORGE H. KENDALL.
EVERETT W. CLEM.
GUSTAF A. PETERSON.
JOHN WARREN VEDDER.